July 28, 1936.   G. W. GARMAN ET AL   2,048,929
ELECTRIC VACUUM CULINARY APPLIANCE
Filed May 31, 1933   5 Sheets-Sheet 1

Fig. 1.

Inventors
George W. Garman and
by Martin Moister
Ralph H. Pamble
Attorney.

July 28, 1936.  G. W. GARMAN ET AL  2,048,929

ELECTRIC VACUUM CULINARY APPLIANCE

Filed May 31, 1933  5 Sheets-Sheet 2

Inventors
George W. Garman and
Martin Moister
by Ralph H. Ramell,
Attorney

July 28, 1936.　　　G. W. GARMAN ET AL　　　2,048,929
ELECTRIC VACUUM CULINARY APPLIANCE
Filed May 31, 1933　　　5 Sheets-Sheet 3

Inventors
George W. Garman and
Martin Moister
by Ralph H. Pamell
Attorney.

Patented July 28, 1936

2,048,929

UNITED STATES PATENT OFFICE 2,048,929

ELECTRIC VACUUM CULINARY APPLIANCE

George W. Garman, Maple Shade, N. J., and Martin Moister, Philadelphia, Pa.

Application May 31, 1933, Serial No. 673,650

12 Claims. (Cl. 219—35)

Our invention pertains to a culinary appliance of the electro-vacuum type, the principal purpose of which is to cook foods within a vacuum chamber, utilizing therefor the heat generated by an electric resistance element.

A further purpose is to automatically regulate the amount of electric current delivered to the heating element, thereby controlling the temperature delivered to the vacuum chamber.

A further purpose is to automatically control the length of time the heating element functions and/or in combination with the temperature of said element.

A further purpose is to cook food or other matter within a vacuum chamber, the chamber being constructed of non-porous material.

A further purpose is to provide a chamber for cooking which is insulated, and which may be used as an alternative structure to a vacuum chamber where cost is a consideration.

A further purpose is to provide an appliance which is portable so that foods can be transported in a heated condition, continuing to cook within a heated vacuum chamber (or insulated chamber) during the transportation.

A further purpose is to provide an appliance which will cook an entire meal within a vacuum chamber (or insulated chamber), the temperature at which said cooking is done and the length of time required to complete the cooking, both being automatically controlled; and to retain the cooked food in a heated condition within the chamber for several hours if necessary, until it is desired to serve.

A further purpose is to provide an auxiliary unit, useable without the chamber structure, but in combination with the electro heat and time controlling mechanism, to function as a hot plate to perform modes of cooking other than roasting or baking.

A further purpose is to provide a base which will support a vacuum chamber (or insulated chamber) and a hot plate structure, useable at one and the same time, and of such design as to enable the user to change the relative positioning of chamber and hot plate upon the base.

A further purpose is to furnish a multiple of different degrees of heat to the electric element.

A further purpose is to provide indicative means, illuminated if desired, to indicate and control the heat and timing mechanisms.

A further purpose is to provide an absolute tight seal between the chamber structure and the base.

A further purpose is to provide a suitable relief valve, to permit the escape of cold air from the vacuum chamber under the influence of the heated air collecting therein.

A further purpose is to reflect heat from below a heating unit, upward within a chamber structure or against a hot plate.

A further purpose is to provide an auxiliary base for the dual purpose of holding the chamber while the hot plate is in use (in the single unit design) and for the transportation of the chamber while containing food, etc. in its heated condition.

Further purposes will appear in the specification and in the claims.

Our appliance comprises a base 20 which houses a source of heat supply and the controls for same, and a substantially dome shaped cover portion 21 comprising preferably an evacuated chamber surrounded by an outer protective casing. These two units are separable at an annular seal, permitting the cover portion 21 to be removed from the base and to be replaced by a hot plate 22 adapted to fit upon the base.

The cover 21 is used when roasting, cooking or baking, the hot plate 22 is used for frying and similar forms of food preparation. A combination design wherein the cover 21 and the hot plate are used simultaneously, is shown in plan in Figure 10.

Figure 9:
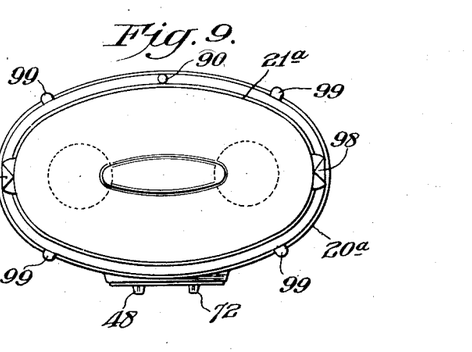
Figure 9 is a plan view of a modified form of different contour.
Figure 10:
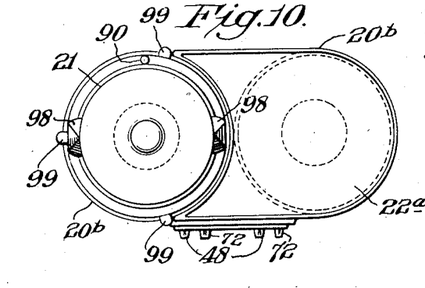
Figure 10 is a plan view of a combination base supporting a chamber and hot plate simultaneously.

The base 20 is illustrated thruout the general drawings as circular in shape, but it will be understood that it may be of any desired form, such for example as that shown in Figure 9, wherein an oval is utilized, or in Figure 10 wherein the ends are semi-circular and the sides straight. It will therefor be understood that whenever "annular" is referred to thruout the specification and claims, its meaning is not to be taken literally, but will be interpreted as referring to the general contour whatsoever that shape may be.

The interior of the base is composed of two dished members 23 and 24, one fitting within the other and held in spaced relation at their outer peripheral edges. The space between the two members is packed with an insulating material 25, and a bolt and nut structure 26 fastened at the center of the members 23 and 24 furnishes means for drawing them together, thereby securing the insulation material within the space between the two members.

The central portion of the dished member 24 forms a reflector for the purpose of reflecting the heat upward toward the interior of the cover portion 21 or the hot plate 22, or both as the case may be.

A bottom plate 27 which is substantially a flattened cone, is formed within the outer walls of the casing 20 at the base, and is fastened at its center to the bolt 26 by a nut 28. A dead air space is thus created about the insulated portion of the base. If however it is found desirable, this air space can be eliminated by substituting insulating material therein.

Formed near the top of the base casing 20 is an annular flange 29, which furnishes a support for the hot plate 22. Above the flange 29 is an inturned edge 30 which forms a seat for two gaskets 31 and 32, one being placed above the inturned edge and the other below it. The outer edges of the dished members 23 and 24 each terminate in a flange, that of the member 24 turning downward and encasing the gasket 31, and that of the member 23 turning outward and forming a support for the gasket 32. When these two members are drawn together by the nut and bolt connection 26, their respective flanges compress the gaskets against the inturned edge 30 of the base casing 20, forming a tight seal about the entire top of the base.

The dished member 24 has formed therein, outwardly of the central reflector portion, two annular grooves 33 and 34, and a seat 35; the groove 33 being outward of and the seat 35 being inward of the groove 34. The groove 33 is adapted to receive a flange of similar shape formed integral with the cover portion 21 and to afford a rest or seat therefor. The seat 35 is adapted to receive and position a spider 36, which in turn supports a heating element 37. The groove 34 is formed so that its lowermost point is below that of the groove 33 and is so positioned that any condensation caused by cooking, when the cover 21 is used, will be caught and retained therein. The reflector which is formed within the member 24 is indicated at 38.

At a convenient point within the base 20 we locate an instrument control box 39. This box extends partly within the base and partly without, and has upon its outer face two dials 40 and 41. The setting of the dial 40 controls the temperature at which the appliance functions, while the setting of the dial 41 controls the duration of time the current is permitted to flow to the heating element. A two-way plug receptacle is also located within the box 39, and is so designed that current of different wattages can be supplied to the heating element by changing the position of the plug within the receptacle.

A lamp 43 is positioned within the control box 39 and illuminates the dials 40 and 41. It is so wired as to automatically light when current is turned on and to cease its illumination, also automatically, when the current is turned off.

A connector of novel design is shown at 44 for passing current from the insrtument box 39 thru the insulated material 25 to the heating element 37. It is so designed as to prevent the passing of any condensate from the interior thru the electric conveying instrumentalities. Flexible contacts 45 are fixed to the heating element and are slidably attached to the connector 44, enabling the user to quickly detach the heating element 37 and remove it together with the spider 36, for cleaning the interior of the reflector 38, and to readily replace same without disturbing the relation of the body portion of the connector to the members 23 and 24, and the insulation 25.

Figure 4:
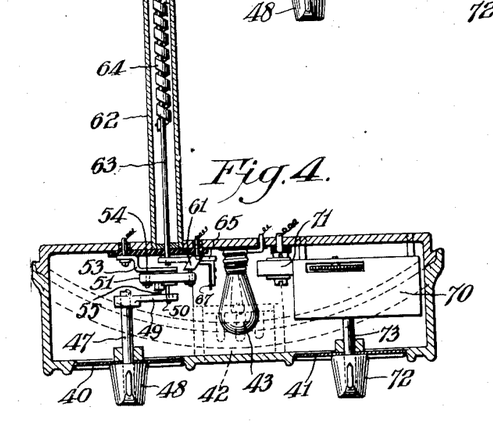
Figure 4 is a sectional plan view taken on line 4—4 of Figure 1, showing the interior of the control box and thermostat.
Figure 5:
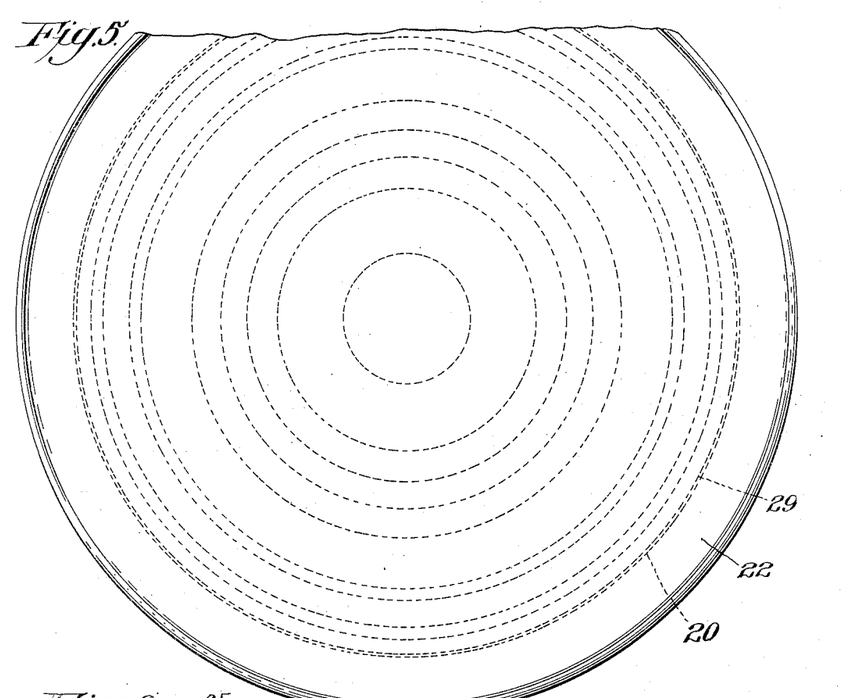
Figure 5 is a plan view with the hot plate section in use in place of the chamber structure.
Figure 6:
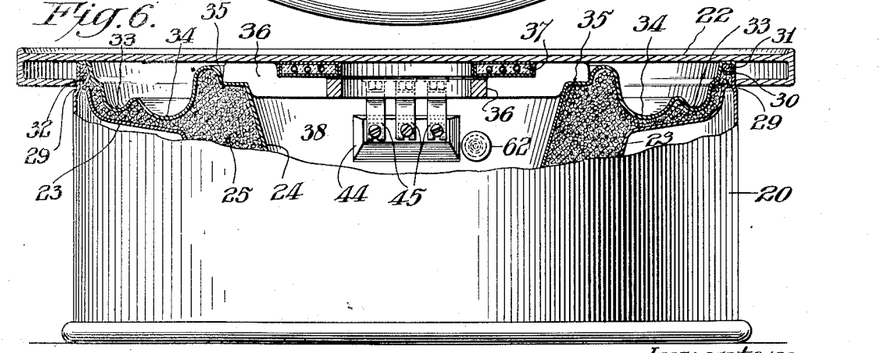
Figure 6 is a side elevation of Figure 5, partly broken away, illustrating the plate and heating element in section.
Figure 7:
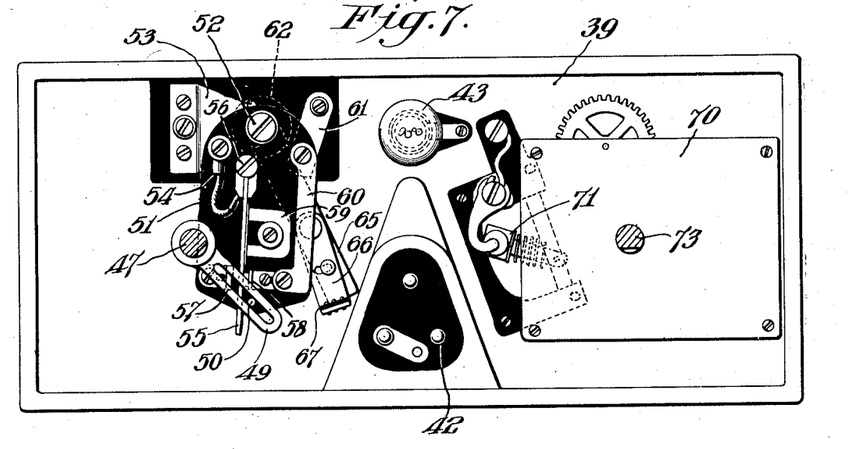
Figure 7 is an enlarged detailed elevation of the control mechanism.
Figure 8:
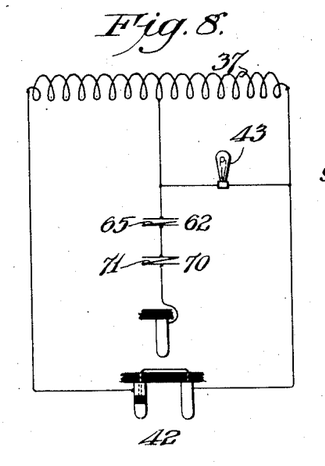
Figure 8 is a wiring diagram.

Referring now to Figures 4 and 7, details of the heat controlling mechanism and the time controlling mechanism are illustrated. The dial 40 has a shaft 47 which carries upon its outer end a combined knob and pointer 48, the pointer being adapted to be set to register with the indications upon the face of the dial to indicate and control the various degrees of heat within the appliance. As the knob and pointer are turned, the shaft 47 is also turned, causing a slotted arm 49 attached thereto describe an arc. A pin 50 carried by an insulated block 51 is adapted to travel in the slot of the arm 49, and any change in the position of the arm will cause the block 51 to move upon a pivot 52.

The pivot 52 is supported by a bracket 53 insulated from the instrument box, but acting as an electric conductor between a movable contact 54 and the block 51 and the heating element. The insulated block 51 supports upon its face a magnetically controlled make and break switch structure, comprising a flexible contact blade 55 fixed upon the block at 56, and its free outer end adapted to be moved between two stops 57 and 58. Both stops are adjustable upon the block to vary the amount of movement of the end of blade 55.

A magnet 59 is also adjustably secured to the block 51 and tends to normally hold the blade 55 against the stop 58. The stop 58 is an electric conductor and connects with one pole of the electric circuit thru a conducting plate 60 and a spring contact 61. When the various parts are in the positions shown in Figures 4 and 7, current is being passed thru the appliance to the heating element.

Arranged in line with the pivot 52, and extending into the interior of the base in close proximity to the heating element 37, we provide a thermostat 62. This thermostat comprises an outer casing housing a shaft 63 about which is coiled a helix spring 64 of thermostatic metal. One end of the spring 64 is fixed within the casing and the other fixed to the shaft 63, so that as the thermostatic metal is affected by the rising temperature and tends to uncoil, a rotary motion is imparted to the shaft 63. This shaft carries on its free end an arm 65, the outer free end of which in turn carries an adjustable lever 66 terminating in a finger extension 67 of insulated material.

As the shaft 63 is rotated under the influence of the expansion of the helix thermostat spring 64, the arm 65 is moved toward the contact blade 55 of the block 51, the insulated finger extension 67 engaging the blade 55 carrying it away from the stop 58 until it rests against the stop 57, thereby breaking the electric circuit and the magnetic contact. When the degrees Fahrenheit have lowered sufficiently to permit the thermostatic helix to contract, a reverse rotation is imparted to the shaft 63, the arm 65 slowly swings back upon its pivot, the insulated contact finger 67 leaves the blade 55 and the magnet 59 draws the latter into contact again with the stop 58 and thus reestablishes the electric circuit.

The block 51 is pre-set according to the figures upon the face of the dial 40, and this setting determines the distance between the extension 67 and the blade 55, i. e. the greater the distance the more heat required to cause the thermostat to move its arm to interrupt the circuit, the less the distance, the less heat required to perform the same function.

A clock 70 of well known design, is employed in the circuit to determine the original starting of the current and its final stoppage. This clock is operated in conjunction with a switch 71 and is wound and set by manipulating a knob and pointer (similar to that indicated at 48) attached to the free end of the clock shaft 73. The turning of the knob 72 winds the clock mechanism, and the pointer is set at the point upon the face of the dial 41 to determine the length of time it is desired to allow the current to pass to the heating element. As the time is consumed, the indicator slowly returns to zero on the dial, at which point the clock switch 71 automatically snaps off, breaking the contact and shutting off the current. As shown in Figure 7, the switch 71 is positioned in contact and passing current to the heating element.

The dual plug receptacle is designed to receive a standard plug, (not shown) which when engaged with two of the prongs, causes the application of current to a part of the heating element, and when another combination is made, the heating of the entire element is accomplished, thus enabling the user to choose either of two different heats or wattages.

Figure 1:
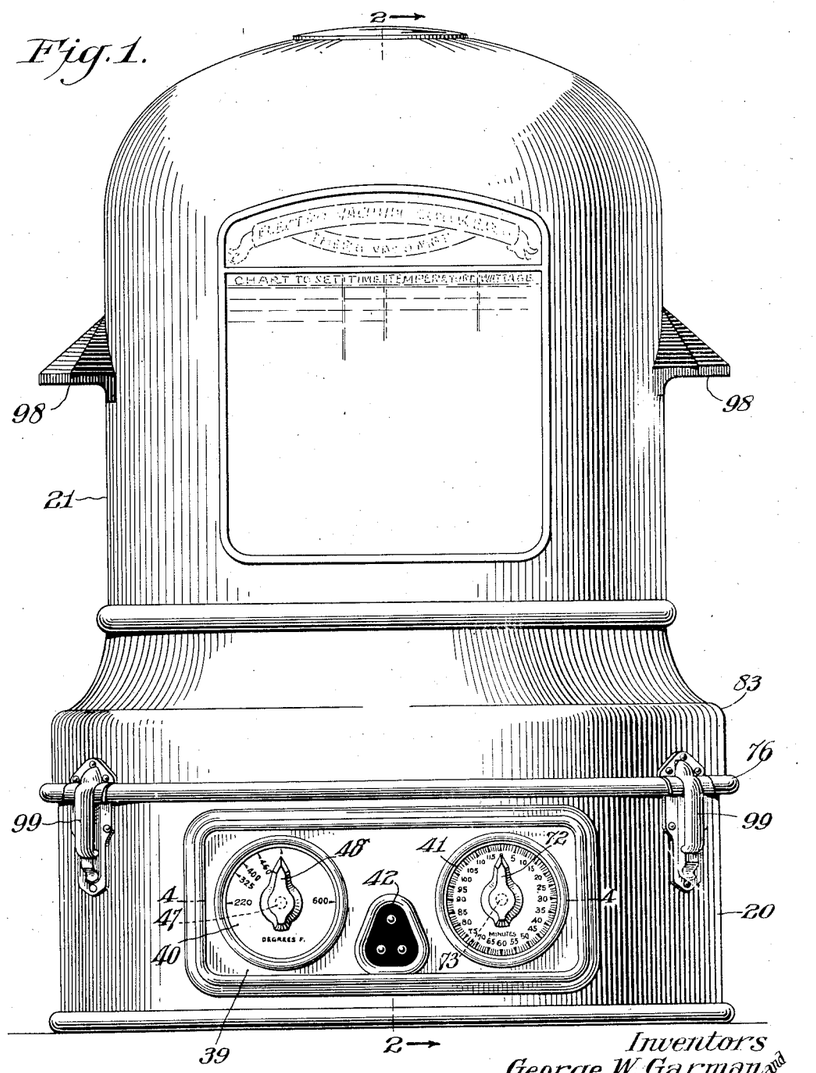
Figure 1 is a front elevation of our improved device.
Figures 2, 2A, 2B:
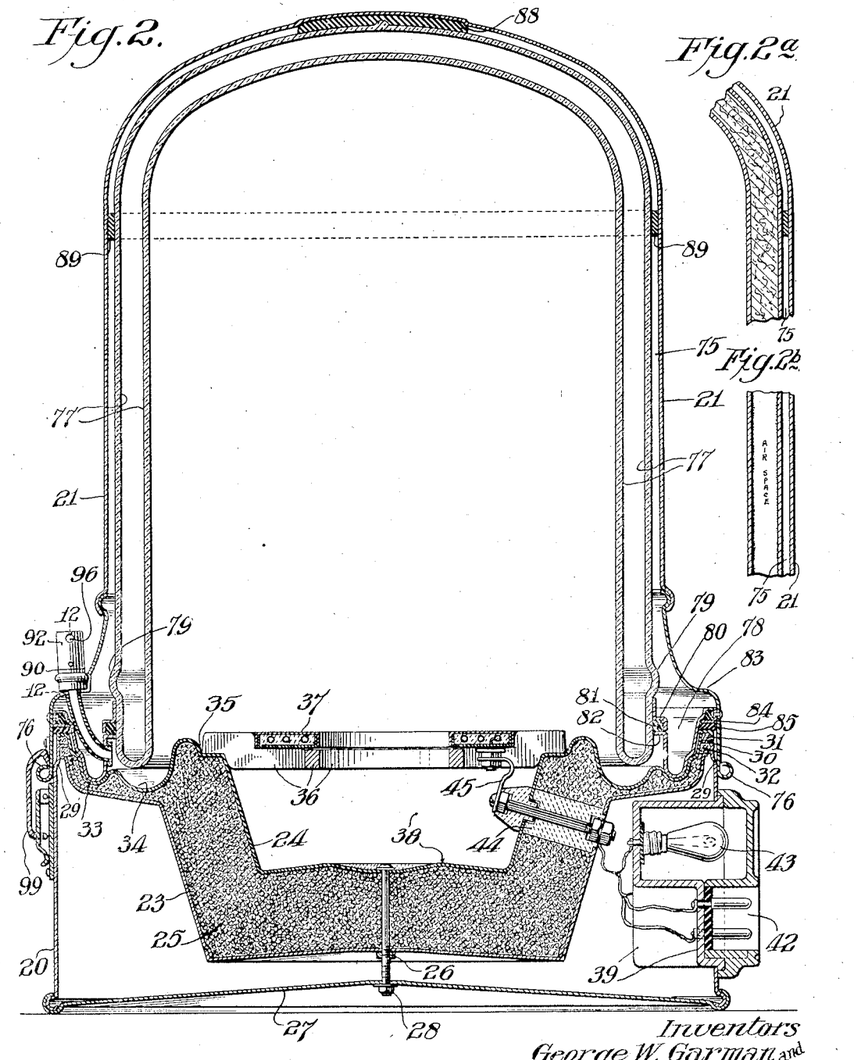
Figure 2 is a vertical section taken on line 2—2 of Figure 1.
Figure 2a is a fragmentary sectional view of a modified form of chamber wall.
Figure 2b is a fragmentary sectional view of another modified form of chamber wall.
Figure 3:
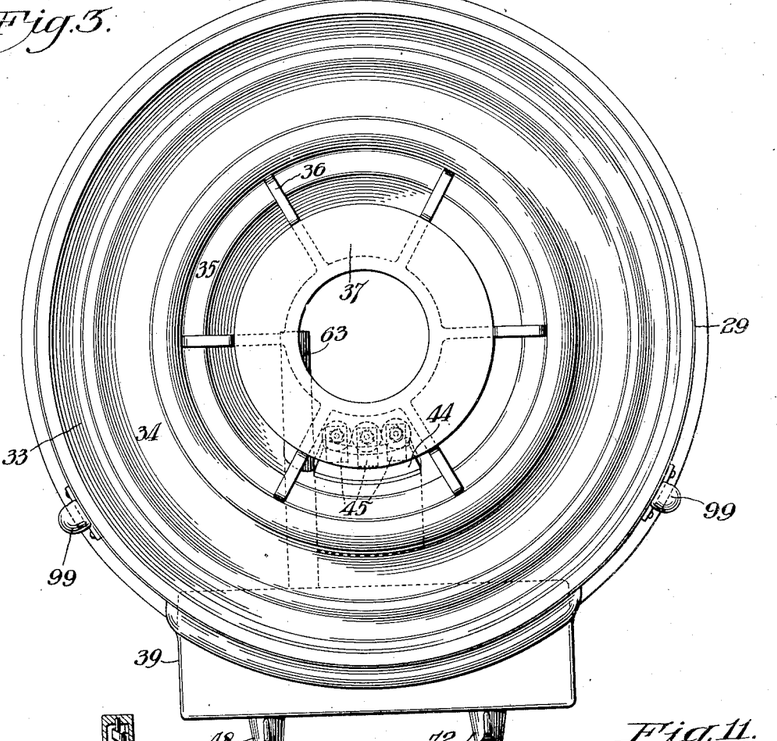
Figure 3 is a plan view of the base section, with the upper chamber section removed.

In the process of roasting or baking, we employ an evacuated or an insulated chamber 75 (in the present instance dome shaped) which consists of the outer casing 21 and an inner member 77 of double wall construction and in the case of the vacuum type, of material suitable to maintain a vacuum within the double walls. Regardless of the form of chamber construction used, whether the preferred type illustrated in Figure 2, the insulated type shown in Figure 2a, or the double walled type with air (dead) space between, illustrated in Figure 2b, the outer protecting covering 21 is used and an air space maintained about the double wall construction outward thereof.

The double wall portion is supported within the outer casing by an annular member 78 substantially U shaped in cross section, and the contour of the bottom of this annulus is of such shape as to co-fit with the groove 33 of the base portion 20.

Surrounding the outside wall of the vacuum chamber 77, near its open bottom, we form a swell 79 beneath which is secured a flanged ring 80 having an annular seat formed between two of its faces, the side wall of the vacuum chamber forming the third face of the seat. Within this seat is secured a packing ring or gasket 81 which rests in turn upon an inturned flange 82 of the annular member 78.

The wall of cover 21 is flared near its bottom open end, as indicated at 83, and terminates in a bead 76. This flare is designed to overlap the annular support 78 and to carry the outer side thereof. Fastened to the inner face of the flared portion is a right angle shaped support 84, upon the upper face of the inturned flange of which is supported a gasket 85 of rubber or other suitable material, in turn supported by the upper outwardly extending flange shape 86 of the interposed support 78.

A second gasket 87 is held below the ring 84 and between the perpendicular wall of the flared portion 83 at its outer periphery and by the outer face of the outer wall of the interposed support 78 at its inner periphery. This gasket is retained within the cover 75 when the chamber is removed and acts as a cushion and forms a seal between the cover and the base 20.

A cushion 88 is secured at the top of the chamber 75 between the external wall of the chamber and the inner face of the casing 21. Another cushioning member 89 is held upon the external portion of the perpendicular side wall 77 of the chamber 75. These two cushions maintain the vacuum (or insulated) chamber in spaced relation to the casing 21.

Figure 11:
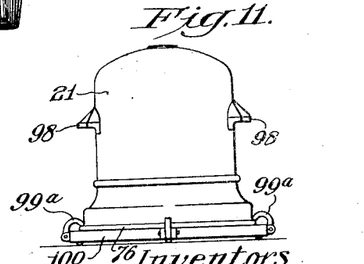
Figure 11 is a front elevation, on a reduced scale, applied to a base designed for use in transportation, etc.
Figure 12:
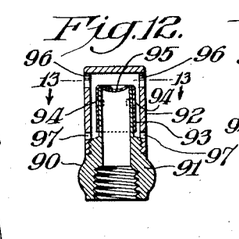
Figure 12 is a detailed section of a relief valve, taken on line 12—12 of Figure 2.
Figure 13:
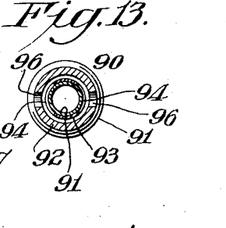
Figure 13 is a detailed horizontal section thereof, taken on line 13—13 of Figure 12.

A safety valve 90 is placed in the flared portion 83 of the cover structure, to permit the escape of excessive pressure and steam condensation which collects during the use of the evacuated (or insulated) chamber, also the cold air which is normally present within the open portion of the chamber at the beginning of the application of heat. As it is necessary to discharge at or near the bottom of the chamber in order to prevent the escape of heat from the upper part of the dome, a valve of special design is necessary to accomplish this requirement. Details of such a valve are shown in Figures 10 and 11, wherein 91 represents an outer casing and 92 a cover cap threaded thereon. The casing 91 is cylindrical, and is in turn threaded upon a section of pipe which connects with the inner face of the supporting member 78 in register with the space beneath the open bottom of the chamber 75. The casing 91 terminates at its upper end in an open cylinder, and loosely mounted thereon is a valve cap 93. This cap is very light in weight and is provided with slots 94 extending therethru and about its circumference, and located near the top. The top of the cap is concave in shape as indicated at 95, and when it is at rest the concavity fits within the cylindrical open end of the casing 91.

It was found by experimentation that a valve of great sensitivity was necessary in order to release the cold air within the chamber 75 as it was gradually forced therefrom by the accumulation of the hot air; the cap 93, which constitutes the sole working part of the valve, is therefore made of very light material, so that the slightest pressure from within the chamber will lift it from its seat. The amount of travel of the valve cap is limited and is stopped by the under side of the cover cap 92, and when this limit of travel is reached the slots 94 will register full open with the cylindrical open top of the casing, permitting pressure to escape from within the chamber 75 and from its lower portion without allowing the escape of the warm air from the upper portion thereof. The pressure escapes to atmosphere thru the openings 96 within the cover cap 92. The cap 92 is further provided with openings 97 near its bottom, which register with a tapered flange at the base of the cylindrical open end of the casing. Any condensation which collects within the cap 92 or between the valve cap 93 and the side wall of the open cylinder upon which it rides, is permitted to drain off thru these openings.

After all the cold air, condensation, etc., has been excluded from the chamber thru the valve 91, the cap valve 93 seats itself upon the open top of the cylinder and the concave portion 95 acts as a seal for the hot, retaining it within the chamber, as the weight of the valve cap is sufficient to overcome the pressure of the heated air.

Handles 98 are conveniently placed upon the side walls of the cover 21 for convenience if removing and replacing it upon the base 20.

Suitable fastening devices 99 are arranged about the outer face of the base and are adapted to tightly secure and hold the cover 21 upon the base.

An auxiliary base 100 is provided for holding the vacuum (or insulated) chamber structure of a single unit appliance during the time in which the hot plate is being used. This base has a further function, i. e. that of acting as a bottom for the chamber while being transported with heat pocketed therein, in which event the clamps 99a are made fast to the rim 76 to unite the chamber and the base. Where multiple unit combinations are used, such as illustrated in Figure 10, the auxiliary base is only necessary for transportation. This base has no heating unit, but is more in the nature of a cushion and rest for the chamber dome, and forms a seal for the heat and at the same time a support for the utensils containing the hot foods while being transported and thereafter until used.

*Operation*

Assuming it is desired to cook a roast dinner, the meat and vegetables are prepared and placed in their respective pans and then placed upon the base 20 above the heating element 37. The cover 21 is then placed over the pans and secured upon its seat 33 by fastening the latching devices 99. These latching devices are not absolutely necessary, as the weight of the chamber is sufficient to seal the top and base structures, there being no great internal pressure at any time.

The electric cord and plug is then attached to the proper prongs of the receptacle 42 to secure the wattage required. The dial 40 is set at the maximum temperature at which it is desired to cook, and the dial 41 is set for the duration of time required to complete the cooking operation. When the dial 41 is set the switch 71 is thrown automatically and current starts flowing to the heating element 37.

The setting of the dials and the selection of the amount of wattage is under the guidance of a suitable instruction chart which is an integral part of the device, the actual setting however, is a manual operation but when once started the remainder of the operation is entirely automatic.

As the heating element 37 gradually becomes hot, the thermostat 62 is affected and operates to move the arm 65. The original setting of the dial 40 has determined the amount of travel the arm 65 must make before it performs its function, i. e. to move the blade 55 and interrupt the electric circuit. When the current is thus cut off, the interior of the chamber 75 cools slightly, affecting the thermostat 62 permitting the helix 61 to act in a reverse direction and thereby cause the return of the blade 55 to contact with the stop 58 and thereby re-establish electric connection with the heating element 37.

The distance of play between the stops 57 and 58 is so slight that practical demonstration has proven, when once the temperature is raised to the desired number of degrees, it can be maintained at the desired point with a variation of from five to eight degrees.

The make and break of current continues as long as the clock switch 71 passes current to the heating element, but as soon as the duration of time for which the clock was pre-set has expired, the switch 71 automatically interrupts the circuit and stops the heating of the element 37 and likewise the flow of current to all other parts of the device.

The cooking is now complete and the cover chamber can be removed from the base 20 and the utensils containing the cooked foods removed and opened for serving. If however, it is desired to maintain the food in a hot condition for later serving, the fact that they are within a vacuum, or within an insulated chamber, will permit their retention for a long time without in any way affecting their quality.

If it is desired to prepare foods of natures other than those requiring oven treatment, the cover chamber is removed (preferably to the auxiliary base 100) and the hot plate 22 substituted upon the base in its stead. The temperature and timing dials are operated in the same manner as before explained in connection with oven cooking, and the wattage selectivity is likewise the same.

The vacuum chamber principle (or insulated chamber) can be utilized for baking purposes as well as for roasting of foods, and there are numerous other purposes to which this device can be applied, and it is our desire to cover all such usages so long as they come within the scope of an automatically time and heat controlled evacuated or insulated chamber.

If it is desired to transport a hot dinner to a point where electric current is not available and to consume it at that place, we utilize the auxiliary base shown at 100, Figure 11, or the base 20 could be used if desired. The food is preferably subjected to a high wattage for a comparatively short initial period over the heating element 37 upon the base 20 and within the chamber 75. The chamber, together with the food content, is then (preferably) removed to the auxiliary base 100 and fastened thereto with the clamps 99a. In this relation the chamber and auxiliary base are taken to the location where it is desired to consume the food, and due to the food being retained within the heated vacuum during this period of transportation, it continues to cook, and is ready to serve hot when taken from the chamber 75. Practical tests has proven the food to be in excellent condition ten hours after the electric current was stopped.

The preparation of a meal requiring the use of both oven and hot plate can readily be accomplished by the use of a structure such as shown in Figure 10, wherein a double heater element 5 is illustrated having a vacuum (or insulated) chamber over one of the heating elements and a hot plate 20b over the other; the hot plate being so designed as to cover all of the base not covered by the chamber 75. This design can readily be made to change the relative positions of the chamber and hot plate, so as to make the combination either with the chamber to the left as shown in Figure 10, or to the right, if light conditions or other reasons require it.

Where multiple unit combinations are used, there is no necessity to interchange the top with the hot plate to complete a meal requiring the use of both, as in this form both are present and they both have individual controls making them independent in their operation, or both may be used at the same time if desired.

Larger bases can be utilized for hotel, restaurant and similar installations, and the various heating units insulated from one another so as to permit their use separately or in unison, and a plurality of vacuum chambers can be placed according to the requirements or fancy of the user.

In view of our invention and disclosure, variations and modifications to meet individual whim or particular need, will doubtless become evident to others skilled in this art, to obtain all or part of the benefits of our invention without copying the structure shown, and we, therefore, claim all such in so far as they fall within the reasonable spirit and scope of our invention.

Having thus described our invention what we claim as new and desire to secure by Letters Patent is:—

1. In a device of the character described, a base, a heating unit therein, a substantially corrugated base top comprising a centrally depressed portion forming a reflector, a raised annulus adjacent the reflector, a depressed annulus outward of the raised annulus forming a gutter or groove, a second raised annulus outward of the groove, a second gutter or groove outward of the second raised annulus, the outer wall of which terminates in an outwardly then downwardly turned flange to form a housing, a gasket or cushion in the housing, a second centrally depressed portion outward of the reflector having an outwardly extending flange beneath the grooves of the first named depressed portion terminating in an outwardly extending flange formed at the top of the side wall of the base and supporting a second gasket, an evacuated chamber of nonporous material, a casing supporting and surrounding said chamber and having a flared substantially bell-shaped bottom, an annular semi-yielding member secured within said flared portion, gaskets interposed between the semi-yielding member and the flared portion of the casing and between the semi-yielding member and the nonporous evacuated chamber, said semi-yielding member being adapted to co-fit with the aforementioned outermost gutter or groove of the base structure to form a tight seal.

2. In a device of the character described, a supporting base, heating units therein, time controlling mechanisms for said units, thermostatic controlling mechanism for said units, a hot plate superimposed upon the base above the heating units, a chamber superimposed upon the base above other of said heating units, the chamber and the hot plate being interchangeable as to their positions upon the base.

3. In a device of the character described, a base structure comprising a heating unit, a reflector beneath said unit, an insulated body surrounding the reflector and having an annular flange outward thereof terminating in a plurality of grooves, an evacuated chamber of nonporous material, an outer protective casing therefor, fastening means therebetween, and an annular yielding member, substantially U shaped in cross section, depending from the protective casing and adapted to co-fit with one of the grooves to form a tight seal.

4. In a device of the character described, a base structure comprising a heating unit, a reflector beneath said unit, an insulated body surrounding the reflector and having an annular flange outward thereof terminating in a plurality of grooves, an evacuated chamber of nonporous material, an outer protective casing therefor, fastening means therebetween, and an annular yielding member, substantially U shaped in cross section, depending from the protective casing and extending below the lowermost portion of the evacuated chamber and adapted to co-fit with one of the grooves to form a tight seal.

5. In a device of the character described, a base structure comprising a heating unit, a reflector beneath said unit having a central depressed portion and an outer flange portion having a plurality of grooves, an evacuated chamber of nonporous material, an outer protective casing therefor, means for fastening the chamber within the casing, an annular yielding member depending from said casing and adapted to co-fit with one of said grooves and to position the chamber above and in register with another of said grooves.

6. In a device of the character described, a base structure comprising a heating unit, two substantially dished shape members, one within the other and held in spaced relation at their outer peripheral edges, insulating material therebetween, fastening means uniting the dished shape members, grooves formed in the innermost member adjacent its peripheral edge, an evacuated chamber of nonporous material, an outer protective casing therefor, cushioning means for supporting the chamber within the casing, an annular yielding member depending f a m said casing and adapted to co-fit with one of said grooves while supporting the evacuated chamber above and in register with another of said grooves.

7. In a device of the character described, a base structure comprising a heating unit, two substantially dished shape members, one within the other and held in spaced relation at their outer peripheral edges, insulating material therebetween, an outer cylindrical casing surrounding the dished shape members, a bottom therefor of substantially flattened cone shape, adjustable fastening means uniting the two dished shape members with the bottom, grooves formed adjacent the peripheral edge of the inner dished shape member, an evacuated chamber of nonporous material, a protective casing therefor, cushioning means uniting the chamber and the casing, said casing terminating at its bottom in a flared portion adapted to rest upon the cylindrical casing of the base structure and housing an annular yielding member substantially U shaped in cross section and adapted to co-fit with one of said grooves.

8. In a device of the character described, a base structure comprising a heating unit, two substantially dished shape members, one within the other and held in spaced relation at their outer peripheral edges, the edge of the inner member comprising an outer and an inner groove, the edge of the outer member arranged in close proximity beneath the grooves to form a semi-yielding structure, insulating material therebetween, adjustable fastening means for uniting the two dished shape members, an evacuated chamber of nonporous material, a casing supporting and surrounding said chamber and having a flared substantially bell-shaped bottom adapted to co-fit with the side wall of the base structure and housing an annular yielding member, said yielding member being adapted to co-fit with the outer groove of the inner dished shape member and to position the inner wall of the evacuated chamber above the inner groove thereof.

9. In a device of the character described, a base structure comprising a heating unit, a reflector having annular grooves formed integral therewith and outwardly thereof and adapted to reflect heat upwardly, insulation below said reflector to prevent conduction of heat outwardly and downwardly, a nonporous evacuated chamber superimposed upon the base, said chamber having a lower lip in register with one of the annular channels or grooves, an outer casing surrounding the chamber, an annular semi-flexible member carried thereby and adapted to co-fit with another of said annular grooves of the base portion to form a tight seal.

10. In a device of the character described, a base, a source of heat supply within the base, a reflector having annular grooves formed integral therewith and outwardly thereof and adapted to reflect heat upwardly, insulation below said reflector for preventing conduction of heat outwardly and downwardly, a nonporous evacuated chamber dome shaped in cross section and having an open bottom, the lower lip of which is adapted to register with one of the annular grooves, a casing supporting and surrounding said chamber, a semi-yielding annular structure secured thereto and having one portion thereof adapted to co-fit with another of said annular grooves to form a tight seal.

11. In a device of the character described, a base, a source of heat supply within the base, a reflector arranged beneath the heat supply and adapted to reflect heat upwardly, an evacuated chamber of nonporous material superimposed above the heat supply and adapted to reflect heat inwardly and downwardly.

12. In a device of the character described, a base structure, a source of heat supply therein, a reflecting element arranged beneath the heat supply and adapted to reflect heat upwardly, insulation surrounding the reflector on all sides and at its bottom, an evacuated chamber of nonporous material superimposed above the heat supply and adapted to reflect heat inwardly and downwardly, and an outer protective cover for said evacuated chamber.

GEORGE W. GARMAN.
MARTIN MOISTER.